United States Patent [19]

Wallace

[11] 4,095,874
[45] Jun. 20, 1978

[54] HAND-HELD MICROSCOPE

[76] Inventor: Robert B. Wallace, 2 Taylor St., Littleton, Mass. 01460

[21] Appl. No.: 715,624

[22] Filed: Aug. 18, 1976

Related U.S. Application Data

[63] Continuation-in-part of Ser. No. 619,625, Oct. 6, 1975, abandoned.

[51] Int. Cl.² ............................................. G02B 27/02
[52] U.S. Cl. ..................... 350/239; 350/250
[58] Field of Search .......... 206/5.1; 350/140, 175 SL, 350/235–241, 247, 250, 255, 238, 239

[56] References Cited

U.S. PATENT DOCUMENTS

| 251,721 | 1/1882 | Lomb et al. ................... 350/239 X |
| 1,669,870 | 5/1928 | Fiske ................... 350/241 |
| 2,635,504 | 4/1953 | Hawkins ................... 350/238 |
| 2,986,830 | 6/1961 | Underberg et al. ............ 350/140 X |
| 3,391,975 | 7/1968 | Annis et al. ................... 350/238 |
| 3,519,005 | 7/1970 | Krezanoski et al. ............. 206/5.1 X |
| 3,734,596 | 5/1973 | Nerlich ................... 350/140 |
| 3,756,699 | 9/1973 | Martin ................... 350/140 |

FOREIGN PATENT DOCUMENTS

| 131,216 | 2/1949 | Australia ................... 350/239 |
| 898,085 | 11/1953 | Germany ................... 350/238 |
| 820,215 | 9/1959 | United Kingdom ............ 350/239 |

Primary Examiner—F. L. Evans
Attorney, Agent, or Firm—Jerry Cohen

[57] ABSTRACT

A microscope is shown of generally clamshell-like configuration having top and bottom parts resiliently joined through a connecting structure. Hand deflection of the parts, resiliently resisted, results in relatively reduced motion between lens and specimen for focusing. The microscope may be formed as a unitary molding of resinous plastic or as a blank of foldable sections, and it may have built-in slide retainers. The light admitting aperture may be used to precisely locate a liquid specimen for viewing within the focal range of the microscope.

16 Claims, 21 Drawing Figures

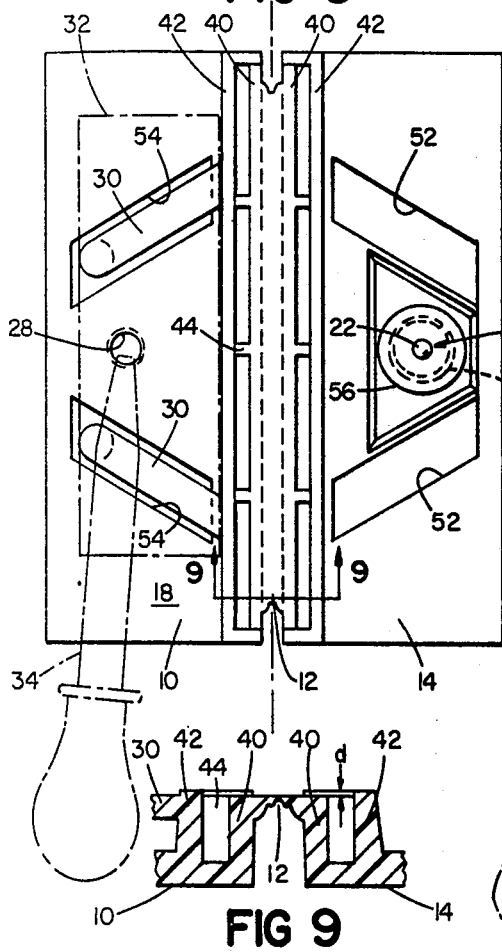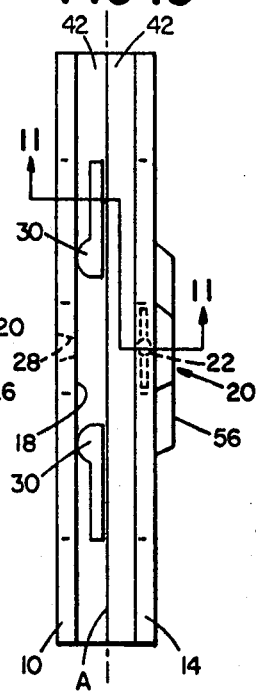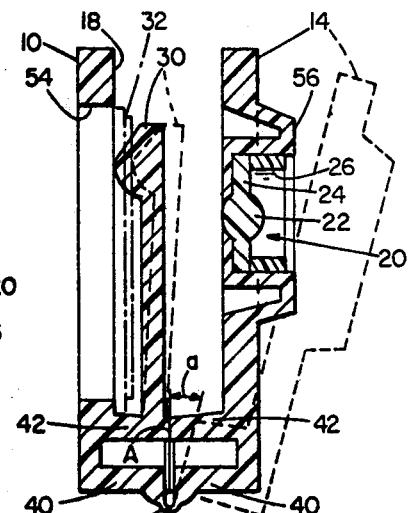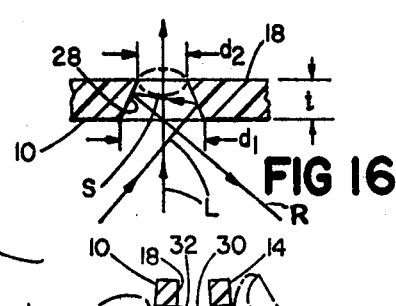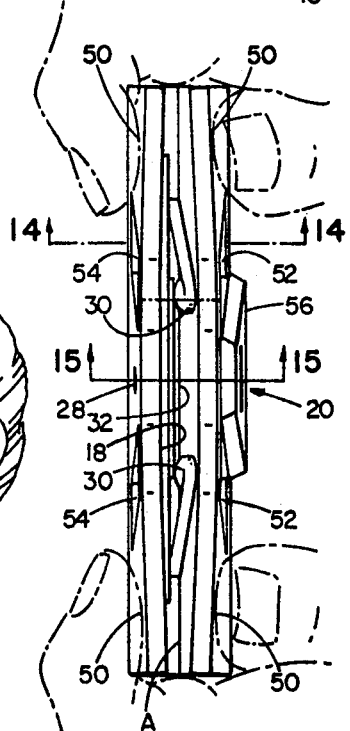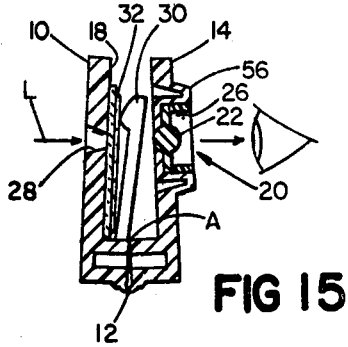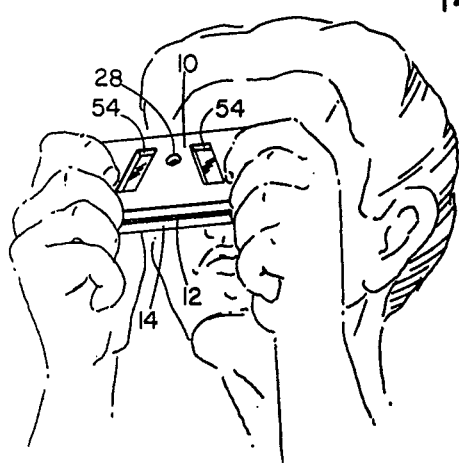

HAND-HELD MICROSCOPE

This application is a continuation-in-part of my application Ser. No. 619,625 filed Oct. 6, 1975, now abandoned.

This invention relates to a microscope useful by students and others in laboratory and field work. Objects of the invention are to produce an inexpensive and rugged microscope which is easy and safe to handle even by unskilled users in the steps of inserting slide or liquid specimens, focusing and observing. Moreover, in one embodiment of the microscope a standard or classical glass slide is not necessary.

According to this invention there is provided a microscope comprising a stage capable of being illuminated and defining a specimen position, a viewing aperture arranged to accept and hold a lens, and means enabling adjustment of the distance between the lens and stage for focusing. The microscope is further characterized in that the lens and the stage are resiliently joined by connecting structure means which include hand pressure regions for stressing the connecting structure means to change the distance between the lens and the stage in a resilient manner. In its unstressed or nonfocused position, the structure establishes a nonfocused rest relation between the lens and the stage. The range of movement which is permitted by stressing the connecting structure means to a focusing position in response to the deflection of the hand pressure regions enables focusing between the lens and the stage. Subsequent release of the pressure enables the return by the connecting structure means of the lens and the stage to the rest or nonfocused relation.

In preferred embodiments the microscope comprises top and bottom members extending as cantilevers from intermediate connecting structure, one member carrying the viewing lens and the other providing a specimen stage, at least one of the members being resiliently deflectable toward the other about the intermediate structure to attain desired focusing.

In a first embodiment of the microscope of this invention, these top and bottom members are joined by a plastic hinge and comprise a unit molded integrally of resilient resinous plastic. The hinge comprises a reduced-thickness segment joining corresponding edges of the top and bottom parts, the parts having mutually engaging portions spaced from the hinge, providing a fulcrum for the deflection. The top and bottom parts are provided with hand pressure regions at points spaced from the lens enabling motion of the parts in response to hand pressure to translate into relatively reduced motion between the lens and stage. Flexure points are provided in the top and bottom parts between the pressure regions and the aperture, and these flexure points may have openings registering with retainers for a specimen slide. A tapered, light-admitting aperture, having the smaller diameter nearer the lens, serves both to reduce admission of scattered light and to precisely locate a liquid specimen.

This first embodiment of the microscope may be further described as being of a clamshell-like configuration comprising a unitary molding of synthetic resinous plastic having top and bottom members joined along a respective edge of each by a plastic hinge, one of the members defining a viewing aperture and the other defining a specimen stage and a light emitting aperture. The microscope is capable of being focused by hinged movement between the top and bottom members. Preferably, the top and bottom members have a partially closed rest position, which is achieved by permanent set of the resinous plastic. Also, slide retainers are preferably associated with the bottom part in a position to make them capable of entering openings in the top part when the parts are brought toward each other.

In a second embodiment of the microscope of this invention, there is provided an initially flat blank suitable for folding to form the microscope having a clamshell-like configuration. The sheet is formed of a relatively rigid material in rectangular form comprising six sections, which are, in order, first and second top member sections, a first connecting structure means section, first and second bottom member sections and a second connecting structure means. The first and second top and bottom member section are folded over and adhered to form the top and bottom members, suitable lens and light admitting apertures being provided. The first and second connecting structure means sections are adhered to complete the formation of the clamshell-like configuration and to form a microscope having the characteristics described.

The stated objects of the invention will in part be obvious and will in part be apparent hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a perspective view of one embodiment of the microscope of this invention;

FIG. 8 is a top view of the microscope of FIG. 1 shown open in the position in which it comes from the mold or as opened for insertion of a specimen;

FIG. 9 is a partial cross-section taken on line 9—9 of FIG. 8;

FIG. 10 is a front edge view of the microscope folded in closed position;

FIG. 11 is a cross-section view taken on lines 11—11 of FIG. 10;

FIG. 12 is a perspective view of the microscope with the specimen inserted, in the position of use by a student;

FIG. 13 is a view similar to FIG. 10 but showing the hands of the student focusing the microscope;

Figure 17:
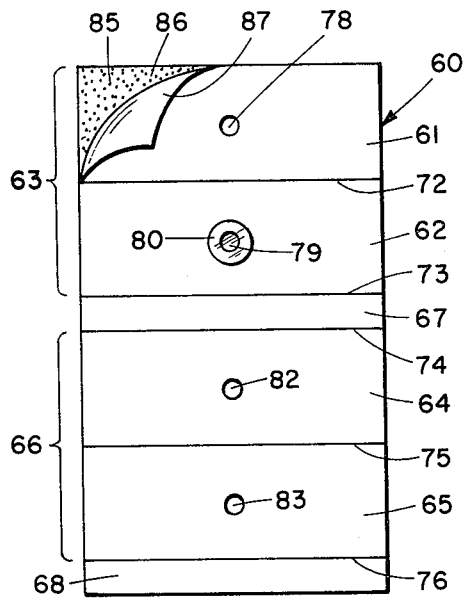
Figure 19:
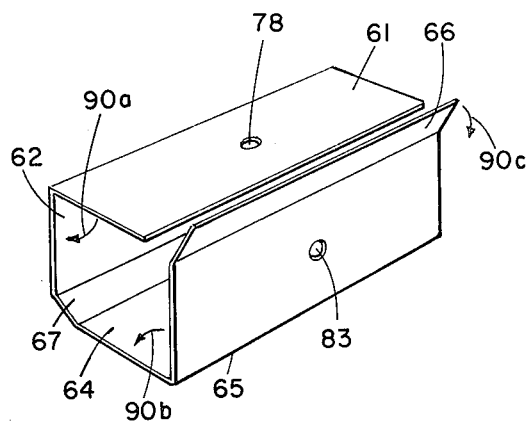
Figure 18:
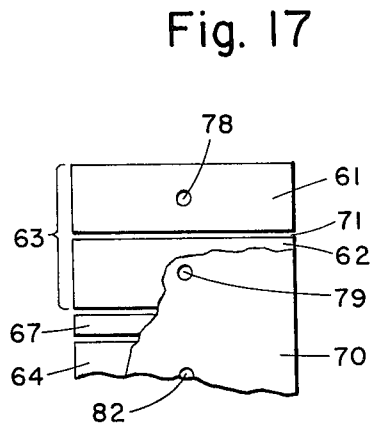
Figure 20:
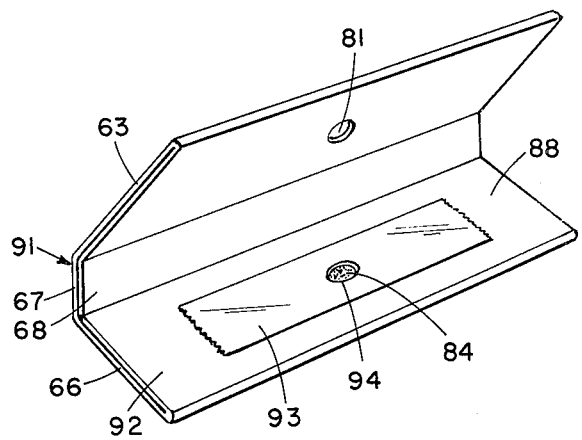
Figure 21:
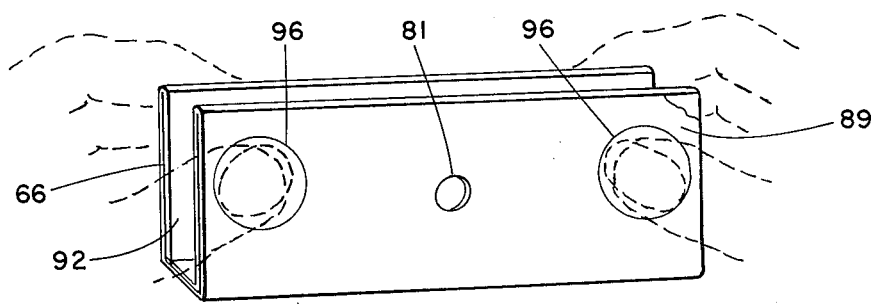

FIGS. 14 and 15 are cross-sectional views taken on lines 14—14 and 15—15 of FIG. 13;

FIG. 16 is a cross-sectional view of the light admitting aperture of FIG. 15 on an enlarged scale;

FIG. 17 is a plan view of a blank used in forming another embodiment of the microscope of this invention;

FIG. 18 is a fragmentary plan view showing a modification in the construction of the blank used to form the microscope;

FIG. 19 illustrates in a perspective view the steps of folding to make the microscope of this invention from the blank of FIG. 17;

FIG. 20 is a perspective view of the microscope in the rest or unfocused position; and FIG. 21 is a perspective view of the microscope in its stressed or focusing position.

Referring to FIGS. 1-16, the first embodiment of the microscope is shown as a unitary molding of clamshell-like configuration comprising bottom member 10 joined by living or plastic hinge 12 to top member 14. Members 10 and 14 are of elongated form, the hinge extending along their length and the joining long edges of the two members. Top member 14 has a central aperture 20 for viewing, a spherical lens 22 being mounted in the aperture 20 by means of peripheral mounting flange 24 retained in position by a resilient c-shaped spring member 26. The bottom member has a light-admitting aperture 28 aligned with viewing aperture 20, the aperture tapering from diameter $d_1$ to diameter $d_2$ over length $t$, (FIG. 16). Typically for a value of $t = \frac{1}{8}$ inch, $d_1$ may be 13/64 inch and $d_2$ 11/64 inch.

Bottom member 10 also has a pair of specimen slide retainers 30 mounted to press a specimen slide 32 (see FIG. 8) against stage surface 18 of the bottom member. In closed position, referring to FIG. 12, the user grasps the clamshell microscope, registers viewing aperture 20 with his eye and looks through the assembly and light-admitting aperture 28 toward a light source. A liquid specimen introduced into the light-admitting aperture 28, as suggested by the dropper 34 shown in dotted lines in FIG. 8 and by liquid specimen S in FIG. 16, is precisely located with respect to the lens by the cooperation of surface tension effects and the tapered construction of the aperture. Such a liquid drop specimen is illuminated and viewed. Certain light rays R, non-parallel to the optical axis L, strike the tapered wall and that portion of the light which is not absorbed is reflected to the opposite wall, thence back from the microscope, with resultant benefit in the quality of illumination. Coarse focusing is achieved by moving the bottom and top members 10 and 14 from their spread-apart position, e.g., the position shown in FIG. 8, to their preset rest relationship, e.g., the position of top member 14 shown in dotted lines in FIG. 11. Fine focusing is achieved by the further deflection of the matching ends of the bottom and top members by the fingers grasping and squeezing the unit as suggested in FIGS. 12-15. Details of construction, now to be discussed, facilitate this action.

Referring to FIGS. 8, 9 and 11, the living hinge 12 comprises a thin flexible strip of generally well-known predetermined form, and each edge joined by the hinge comprises a first elongated rib 40 joined to the hinge. A second rib 42 is spaced from first rib 40 by a distance which generally corresponds to the thickness of the ribs, each rib 40 being joined to a rib 42 at the bottom by the body of the respective member 10 or 14. Excepting at their ends, the outer ribs 40 are shorter in height by distance $d$ (e.g., 0.010 inch) than the inner ribs 42 as shown in FIG. 9. Thus, when the top and bottom members are pressed together as shown in the solid lines in FIG. 11, inner ribs 42 meet at contact region A while ribs 40 do not meet except at their extreme ends. For stabilizing the ribs, cross ribs 44 are provided, being spaced, for example, about one inch apart. When folded to the position of FIGS. 1 and 11, the major widths of the top and bottom members extend as cantilevers from the region of contact A. Deflection of these cantilevers towards each other is increasinggly resisted by tghe hinge 12, the contact region A serving as a fulcrum and the hinge being placed under increasing tension.

Figure 2:
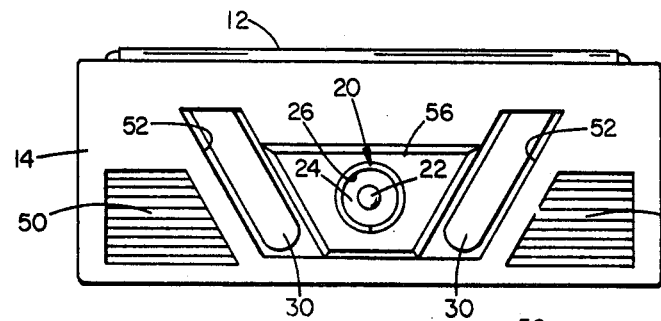
FIGS. 2–7 are views taken respectively from the top, front edge, bottom, back edge and left and right ends of the embodiment at FIG. 1.
Figure 3:
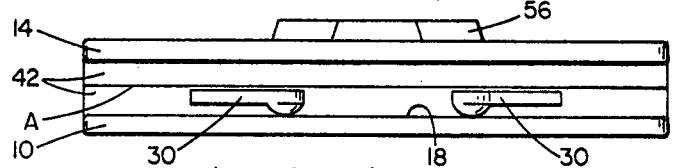
Figure 4:
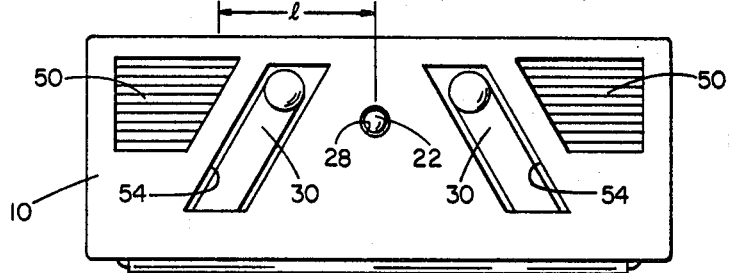
Figure 5:
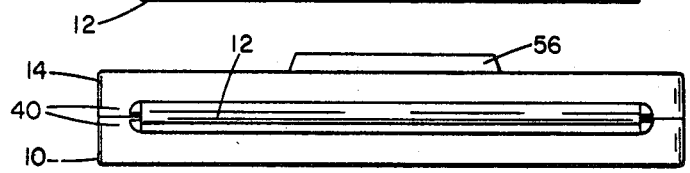
Figure 6:
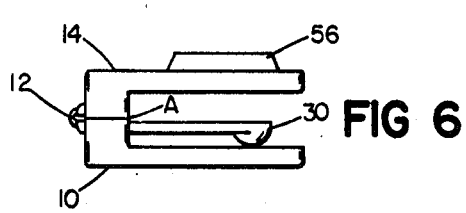
Figure 7:
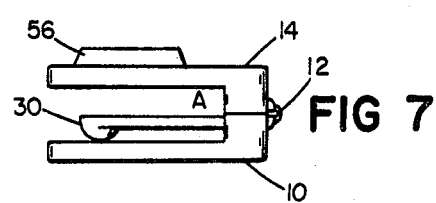

Serrated finger pressing regions 50 on both extremities of both top and bottom members, as shown in FIGS. 2 and 4, locate the proper position of the fingers for producing this focusing deflection.

Because the pressure applying regions 50 are spaced longitudinally at distance $l$ from the central viewing line, and because the resilient hinge is continuous along the edge of the top and bottom members, deflection of the regions 50 toward each other results in a deflection of somewhat lesser magnitude of the lens toward the specimen than that of the outer ends of the top and bottom members. Thus motion of the user's fingers result in relatively finer focusing movement of the lens toward the specimen. This effect is further enhanced by cut-outs 52 and 54 in both members 10 and 14, providing flexure points in the body of top and bottom members 10 and 14, resulting in reduced movement of the central portion, which carries the lens relative to that of the extremities beyond the cut-outs. Furthermore, the increased thickness 56 of the top member in the region of the lens, relative to the thickness of the extremities, provides further resistance to deflection of the top member and reduces again the ratio of the deflection of the lens to the deflection of the extremities 50 of the microscope.

The cut-outs 52 and 54 serve other purposes as well. By looking downward through the cut-outs 52 in top member 14, on either side of the aperture 20, it is possible to see the outlines of the specimen slide, this serving as a visual guide for aligning the specimen slide with the viewing aperture. Furthermore, slide retainers 30, projecting integrally from the inner rib 42 of the lower member, and serving as spring retainers for the specimen slide 32 as viewed in FIG. 8, can, upon deflection of parts 10 and 14 toward each other, enter the openings 52 in the upper member. This in turn avoids concentration of detrimental force upon the specimen slide that would result if the retainers were forced against the upper member.

The size of the top and bottom members 14 and 10 is greater than the predetermined size of the specimen slide 32, thus allowing freedom for the specimen to be moved longitudinally or laterally for alignment with the aperture while being retained within the protective boundaries offered by the top and bottom members. This protects the user from cuts and the specimen slide from breakage.

In the embodiment of FIGS. 1-16, the entire microscope body, i.e., top and bottom members 14 and 10 and joining hinge 12, is molded as an integral unit of a suitable polymeric resin such as polypropylene. Then, while still warm from the molding process, the unit of FIG. 8 is folded to assume its closed configuration and chilled. Thus a permanently set, partially closed position is achieved as shown in the dotted lines in FIG. 11. Lens 22, e.g., of 30× or 50× magnification, is then inserted, followed by insertion of the spring retainer 26.

Typically, the top and bottom members are about 4 inches long, 1½ inches wide, and generally ⅛ inch thick. Ribs 42 extend somewhat in excess of an additional ⅛ inch from the main body of the top and bottom members, establishing a closed spacing between the lens and specimen in excess of ¼ inch and an overall thickness of the microscope in closed position of less than one inch. Thus the microscope is readily portable.

The permanent set of the unit in partially open position produces some resistance by the hinge before closure to parallelism of the top and bottom members, which is helpful to achieving focus, especially when unusually thick specimen slides are employed. For portability the unit is slipped into an envelope which overcomes this resistance and holds the unit compactly in closed position.

FIGS. 17-21 illustrate another embodiment of the microscope of this invention, an embodiment which is initially formed as a flat piece or blank of a relatively rigid material such as cardboard, boxboard or a bendable plastic. This initial flat blank is then folded to form the microscope having the desired characteristics.

FIG. 17 is a plan view of the internal surface of a flat blank 60 divided into sections 61 and 62 used to form the top member 63, sections 64 and 65 used to form the bottom member 66, section 67 joining top member 63 and bottom member 66, and serving as one part of the connecting structure means, and section 68 used to form the other part of the connecting structure means.

Flat blank 60 may be constructed in one of several ways. For example, as shown in FIG. 18, the various sections 61-68 may be separate individual pieces of cardboard, plastic film or the like adhered on their internal surface to a continuous bendable sheet material 70 such as a resin coated paper. The sections are placed in spaced relationship, the spaces, such as space 71 between sections 61 and 62, being of a sufficient width to allow free bending of the sections 61, 62, etc., relative to each other. Alternatively, the flat blank may be formed of a unitary piece of material as shown in FIG. 17 and the boundaries 72-76 between the sections may be scored or otherwise treated to permit bending of the sections as hereinafter described.

The central viewing aperture of the assembled microscope includes openings 78 and 79 (normally circular) in sections 61 and 62 forming upper member 63. Lens 80 is affixed to either section 61 or 62 to be concentric with either opening 78 or 79 so that when section 61 is folded through 180° to contact section 62, and is adhered thereto, openings 78 and 79 coincide and lock in lens 80 to form central viewing aperture 81 (FIG. 20) corresponding to central viewing aperture 20 of FIG. 1. In like manner, the light-admitting aperture comprises openings 82 and 83 in sections 64 and 65 which, when section 65 is folded through 180° to contact section 64 and is adhered thereto, coincide to form light-admitting aperture 84 (FIG. 20) corresponding to light-admitting aperture 28 of FIG. 1.

In a preferred embodiment of this invention, the inner surface 85 of the initial blank is coated with an adhesive 86 which may be a delayed-tack, pressure-sensitive adhesive or a so-called cohesive adhesive covered with an easily removable release sheet 87 which, when pulled off, allows the microscope to be formed as illustrated in FIG. 19. Alternatively, the inner surface of the initial blank may be coated with an appropriate adhesive just prior to assembly.

Figure 1:
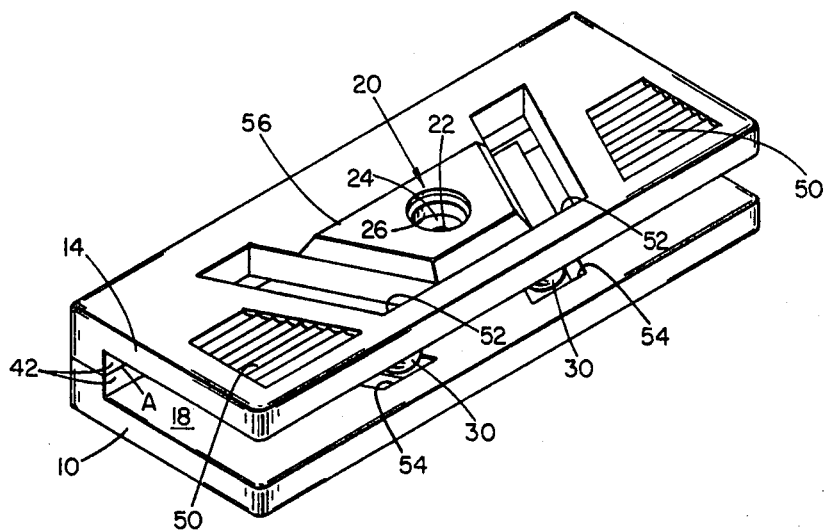

The external surface, i.e., that surface opposite to the internal surface shown in FIG. 1, may have indicia (e.g., designs, instructions, etc.) imprinted thereon. As a final coating on the external surface, it is preferable to have a film or layer of a material which will release a pressure-sensitive tape through a number of applications and removals. Thus, it is preferable when the assembly of the microscope is complete to have the inside surface 88 and outside surface 89 coated with a material such as polyurethane, varnish, a film of polyethylene teraphthalate, or the like.

In forming the microscope, section 60 is folded inwardly, as indicated by arrow 90a in FIG. 19, to contact and be adhered to section 62 to form top member 63 with lens 80 firmly held between sections 61 and 62 and positioned in central viewing aperture 81. In like manner, section 65 is folded inwardly, as indicated by arrow 90b to contact and be adhered to section 64 to form bottom member 66. Finally, section 66 is folded back as indicated by arrow 90c and adhered to section 67 to complete formation of the connecting structure means 91. The inside surface of bottom member 66 forms stage surface 92 which, as noted above, is preferably coated with a material to which a strip of a transparent pressure-sensitive adhesive 93 may be repeatedly applied and removed. This permits specimens 94 which are to be examined in the microscope to be adhered to the surface of the pressure-sensitive which is exposed, through light-admitting aperture 84, on the outside of the assembled microscope. Thus, in this mode of operation, the cost and danger of using a thin glass slide are eliminated. It is, however, also possible to adhere a glass slide to stage surface 92 through the use of a pressure-sensitive adhesive. Alternatively, a drop of liquid for examination may be placed in light-admitting aperture 84 in the same manner as illustrated in FIGS. 8 and 16 for aperture 28.

As in the case of the embodiment of FIGS. 1-16, the embodiment of FIGS. 17-21 has both an unstressed nonfocusing position (FIG. 20) and a focusing position (FIG. 21) due to the resilient nature of the joining of the top and bottom member through the connecting structure means. The top member 63 provides finger pressing regions 96 (shown only for top member 63) which may or may not be marked as shown in FIG. 21 and the microscope embodiment of FIGS. 17-21 is used in the same manner as illustrated in FIGS. 12 and 13.

The embodiment of the microscope of this invention shown in FIGS. 17-21 is particularly suited for being printed on containers for cutting out or for sale as a flat blank along with a lens. It thus provides an educational toy possessing many different application.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. In a microscope unit comprising a stage capable of being illuminated and defining a specimen position, a viewing aperture arranged to accept and hold a lens, and means enabling adjustment of the distance between said lens and said stage for focusing, the improvement wherein said lens and said stage are resiliently joined by connecting structure means which include hand pressure regions for stressing said connecting structure means to change the distance between said lens and said stage in a resilient manner, in unstressed position said structure establishing a nonfocused rest relation between said lens and said stage, the range of movement permitted by stressing said connecting structure means to a focusing position in response to deflection of said hand pressure regions enabling focusing between said lens and said stage, and release of said pressure enabling return by said connecting structure means of said lens and said stage, and comprising top and bottom members extending as cantilevers from said connecting structure means, one carrying said viewing aperture with said lens and the other defining said stage, at least one of said parts being resiliently deflectable toward the other about said connecting structure means for focusing.

and wherein said top and bottom members are provided with said hand pressure regions at points spaced from said lens in a manner whereby the motion of said members in response to hand pressure at said regions translates into relatively reduced motion between said lens and said stage.

2. A microscope in accordance with claim 1 wherein said connecting structure means comprises a hinge molded of resilient resinous plastic integrally with said top and bottom members.

3. A microscope in accordance with claim 2 wherein said hinge comprises a reduced-thickness segment joining corresponding edges of said top and bottom members, said members having mutually engaging portions spaced from said hinge, providing a fulcrum for said deflection.

4. A microscope in accordance with claim 1 wherein said connecting structure means comprises a narrow section formed by folding said top and bottom members to form angles approaching right angles with said narrow section when said microscope is in said focusing position.

5. A microscope in accordance with claim 1 wherein flexure points are provided in said top and bottom members between said pressure regions and said aperture.

6. A microscope in accordance with claim 5 wherein said flexure points are provided by openings registering with retainers for specimen slides.

7. A microscope of clamshell-like configuration comprising a unitary molding of synthetic resinous plastic having elongated parallel top and bottom members joined along a respective long edge of each by a plastic hinge, one of said members defining a viewing aperture and the other defining a specimen stage and a light-admitting aperture, said microscope capable of being focused by hinged movement between said top and bottom members, and wherein said top and bottom members have a partially closed rest position, the unit resiliently resisting movement toward the completely closed position.

8. A microscope in accordance with claim 7 including slide retaining means within said clamshell-like configuration connected to said bottom member to retain slides on said stage and openings in said top member to receive said slide retaining means when said top and bottom members are closed toward each other.

9. A microscope in accordance with claim 7 wherein said light-admitting aperture comprises a tapered hole adapted to position a liquid droplet inserted therein.

10. A microscope in accordance with claim 9 wherein the smaller diameter of said hole is closer to said lens.

11. An initially flat blank suitable for folding to form a microscope of clamshell-like configuration, characterized as being a sheet of a relatively rigid material in rectangular form comprising in order
 (a) first and second top member sections of equal dimensions having centrally-positioned openings, said first top member section being foldable through 180° to be adhered to said second top member section to form a top member with said openings alined to form a lens aperture suitable for positioning and holding a lens therein when said first top member section is adhered to said second top member section;
 (b) a first relatively narrow connecting structure means section being foldable relative to said top member;
 (c) first and second bottom member sections of equal dimensions having centrally-positioned openings, said second bottom member section being foldable through 180° to be adhered to said first bottom member section to form a bottom member with said openings alined to form a light-admitting aperture, said bottom member being foldable relative to said first connecting structure means section; and
 (d) a second relatively narrow connecting structure means section being foldable relative to said second section of said bottom member for adhering to said first connecting structure means section to form said clamshell configuration with said light admitting aperture being alinable with said lens aperture and said top and bottom members being joined in hinged relationship in a nonfocusing position alterable to a focusing position by hinged movement between said top and bottom members.

12. A flat blank in accordance with claim 11 wherein said sheet is a unitary piece of said material having scoring between said sections to permit the folding of said sections.

13. A flat blank in accordance with claim 12 wherein said material is paperboard.

14. A flat blank in accordance with claim 11 wherein said sheet comprises a unitary bendable component to which said sections are adhered as separate pieces in spaced apart relationship to permit the folding of said sections.

15. A flat blank in accordance with claim 11 including a pressure-sensitive adhesive covering the internal contacting surfaces of said sections and a removable release sheet covering said adhesive.

16. A flat blank in accordance with claim 11 including a coating covering the external surface of said sections, said coating being of a material to which a pressure-sensitive tape may be repeatedly applied and removed.

* * * * *